United States Patent
Holubecki et al.

(10) Patent No.: US 12,104,658 B2
(45) Date of Patent: Oct. 1, 2024

(54) PNEUMATIC ACTUATOR

(71) Applicant: ZF CV Systems Europe BV, Brussels (BE)

(72) Inventors: Daniel Holubecki, Katy Wroclawwskie (PL); Marcin Trela, Wroclaw (PL)

(73) Assignee: ZF CV Systems Europe BV, Brussels (BE)

( * ) Notice: Subject to any disclaimer, the term of this patent is extended or adjusted under 35 U.S.C. 154(b) by 0 days.

(21) Appl. No.: 18/023,820

(22) PCT Filed: Sep. 3, 2020

(86) PCT No.: PCT/EP2020/074592
§ 371 (c)(1),
(2) Date: Feb. 28, 2023

(87) PCT Pub. No.: WO2022/048752
PCT Pub. Date: Mar. 10, 2022

(65) Prior Publication Data
US 2023/0304540 A1    Sep. 28, 2023

(51) Int. Cl.
*F16D 25/08*    (2006.01)

(52) U.S. Cl.
CPC .... *F16D 25/083* (2013.01); *F16D 2200/0021* (2013.01); *F16D 2200/003* (2013.01); *F16D 2300/08* (2013.01); *F16D 2300/12* (2013.01)

(58) Field of Classification Search
CPC ... F16D 25/08–083; F16D 2125/04–06; F16D 2200/0021; F16D 2200/003
See application file for complete search history.

(56) References Cited

U.S. PATENT DOCUMENTS 6,016,898 A * 1/2000 Duquesnes ........... F16D 25/087
192/85.01
6,092,637 A * 7/2000 Otto ..................... F16J 15/3236
277/572
(Continued)

FOREIGN PATENT DOCUMENTS

DE           10039242 A1    3/2001
DE      102017011528 A1    6/2019
(Continued)

OTHER PUBLICATIONS

Heitbaum, Raw translation of reference EP1887242A2, Title Device for pneumatic actuation of a vehicle clutch, Feb. 13, 2008, 27 pages. (Year: 2008).*
(Continued)

*Primary Examiner* — Stacey A Fluhart
*Assistant Examiner* — Lillian T Nguyen
(74) *Attorney, Agent, or Firm* — Dickinson Wright PLLC

(57) ABSTRACT

A pneumatic actuator (1) includes a pneumatic piston (4) and a pneumatic body (6) that includes a main body (8) and a guide shaft (10) for guiding the pneumatic piston (4). A pneumatic chamber (14) is defined between the guide shaft (10) and the main body (8). The pneumatic piston (4) is received in the pneumatic chamber (14) and slidably arranged on the guide shaft (10). The main body (8) and the guide shaft (10) are separate elements, wherein the guide shaft (10) is fixed to a fixing portion (16). The main body (8) is made from a first material (M1) and the guide shaft (10) is made from a second material (M2) having a higher wear resistance than the first material (M1). The actuator may be used in a clutch assembly (104) and a commercial vehicle (101).

18 Claims, 5 Drawing Sheets

(56) References Cited

U.S. PATENT DOCUMENTS

| | | | | |
|---|---|---|---|---|
| 2001/0011626 A1* | 8/2001 | Meyer | .................... | F16D 25/083 |
| | | | | 192/85.51 |
| 2003/0010595 A1* | 1/2003 | Heller | ................ | F16D 25/083 |
| | | | | 192/85.51 |
| 2004/0206598 A1* | 10/2004 | Braun | .................. | F16D 25/083 |
| | | | | 192/85.01 |
| 2011/0076096 A1* | 3/2011 | Slayne | .................. | F16C 29/002 |
| | | | | 403/372 |

FOREIGN PATENT DOCUMENTS

| | | | | |
|---|---|---|---|---|
| EP | 1887242 | A2 | 2/2008 | |
| FR | 2745616 | A1 | 9/1997 | |
| GB | 2382634 | A * | 6/2003 | ........... F16D 25/083 |

OTHER PUBLICATIONS

European Patent Office, Rijswijk, Netherlands, International Search Report of International Application No. PCT/EP2020/074592, Mailed Apr. 16, 2021, 4 pages.

* cited by examiner

PNEUMATIC ACTUATOR

FIELD

The present disclosure relates to a pneumatic actuator, in particular a pneumatic clutch actuator for a commercial vehicle. The actuator includes a pneumatic piston, for actuating a functional element, and a pneumatic body. The pneumatic body includes a main body and a guide shaft for guiding the pneumatic piston. The guide shaft includes a central orifice for passing a shaft through the pneumatic actuator, wherein a pneumatic chamber is at least partially defined between the guide shaft and the main body and arranged around the guide shaft. The pneumatic piston is received at least partially in the pneumatic chamber, and is slidably arranged on the guide shaft. The present disclosure further relates to a clutch assembly and a commercial vehicle.

BACKGROUND

In vehicles, in particular in commercial vehicles, there are multiple ways of implementing an automatic transmission. Besides automated gearboxes, automated manual transmission (AMT) systems are often used. AMT systems include a traditional manual transmission gearbox, which is automatically actuated. In an AMT system, a clutch connecting the gearbox to the drive shaft of the vehicles motor is often automatically actuated, in order to eliminate the need for a manual clutch actuation. A clutch actuator disengages the clutch, and then a gearbox actuator shifts gears. After the gear shift, the clutch actuator releases the clutch and engages the drive shaft and the gearbox. Types of clutch actuators commonly used are electro-mechanical, hydraulic or pneumatic clutch actuators.

There are two common types of pneumatic clutch actuators. Standard piston type pneumatic actuators have a piston slidably arranged in a cylinder. Upon actuation the cylinder is filled with air and moves the piston relative to the cylinder. The piston is connected to an actuation rod which operates the clutch. Because the drive shaft of the vehicle motor needs to be in line with the clutch and the gear box, standard piston type pneumatic actuators are mounted offset to the clutch. Therefore, the actuation rod is formed as a fork type rod extending perpendicular to an actuation direction of the piston. However, this arrangement has multiple disadvantages. In order to provide the required mechanical strength, such actuation system needs to be very large and heavy. Moreover, multiple parts are required resulting in a complex systems, wherefrom high costs arise.

Therefore, concentric clutch actuators have been developed. Concentric pneumatic clutch actuators include a pneumatic body and a pneumatic piston movably arranged in a pneumatic chamber of the pneumatic body. The pneumatic piston is movable back and forth in the pneumatic chamber and adapted to actuate a functional element. For passing a shaft through the pneumatic actuator the pneumatic body includes a central orifice. As a result, such pneumatic clutch actuators can be arranged around the shaft and the pneumatic piston can directly actuate the clutch. The need for a separated connection rod arrangement is eliminated. As the pneumatic piston can directly actuate the clutch, mechanical stresses are reduced and concentric clutch actuators may be manufactured smaller. Furthermore, fewer parts are needed, which reduces overall cost.

In general, the pneumatic piston is slidably arranged on a guide shaft of the pneumatic body. As the piston moves back and forth on the guide shaft, the guide shaft and the piston are subjected to wear. Therefore, the pneumatic bodies of known concentric clutch actuators are made from steel. However, steel has drawbacks with regard to manufacturing and weight. Due to its mechanical properties, steel is difficult to machine. As pneumatic bodies of clutch actuators have complex shapes with multiple cavities, increased manufacturing cost results therefrom. Generally, manufacturing cost as well as reliability are of utmost importance for components in the automotive and commercial vehicle industry.

SUMMARY

Therefore, it is an object of the present disclosure to provide a cost efficient and reliable pneumatic actuator.

To solve this object, the present disclosure provides in a first aspect that the main body and the guide shaft are separate or operationally coupled elements, wherein the guide shaft is fixed to a fixing portion of the main body, and wherein the main body is made from a first material and the guide shaft is made from a second material having a higher wear resistance than the first material. The present disclosure provides a multi-part construction of the pneumatic body that is adapted to the diverging requirements on the pneumatic body. The main body is preferably made from a first material that is easy to use and/or machine. Manufacturing of the main body is facilitated and overall manufacturing cost, in particular tooling cost, labor cost, and machine runtime cost, is reduced. Moreover, production processes may be used that are not suitable for steel. Preferably, the first material is a castable material, in particular a pressure die castable material.

The second material of the guide shaft has a higher wear resistance than the first material and ensures a high reliability of the pneumatic actuator. The guide shaft usually is a linear body, preferably a rotationally symmetrical body. The inventors have found that due to its simple form the guide shaft can be easily manufactured even when a highly wear resistant material is used. By using different materials for the main body and the guide shaft, manufacturing cost for the pneumatic actuator is effectively be reduced.

Moreover, applying the multi-part construction further facilitates manufacturing. Because the main body and the guide shaft correspondingly define the pneumatic chamber, the need to manufacture complex internal cavities is eliminated, which further reduces manufacturing cost. Preferably, the second material has a wear resistance that is at least 1.05 to 10, preferably 1.05 to 5, preferably 1.1 to 5, particularly preferred 1.2 to 3, times the wear resistance of the second material. A wear resistance of the second material having a value that is two times the wear resistance of the first material means that a guide shaft manufactured from the second material would under identical conditions have an overall lifetime that is two times the life time of a guide shaft manufactured from the first material.

The fixing portion is the portion of the main body to which the guide shaft is fixed. Preferably, the fixing portion is a continuous portion of the main body. However, the fixing portion may also comprise multiple subportions to which the guide shaft is fixed. Preferably, the fixing portion is adapted to spatially define a position of the guide shaft relative to the main body. It shall be understood that the guide shaft preferably includes a second fixing portion corresponding to the fixing portion of the main body.

The pneumatic chamber is preferably accessible from a first side of the main body and the fixing portion is at least partially defined on a second side of the main body that is opposite the first side. Accessible means that the pneumatic piston can be inserted in the pneumatic chamber from the first side. It shall be understood that a pneumatic chamber accessible from the first side can still be closed by the pneumatic piston when the pneumatic actuator is assembled. The pneumatic piston is movable back and forth in the pneumatic chamber for actuating a functional element. The pneumatic chamber preferably is an annular chamber. It is also preferred that the pneumatic chamber is concentrically arranged to the central orifice. By arranging the pneumatic chamber concentrically to the central orifice, the chamber is then also concentrically arranged to the guide shaft received in the central orifice when the pneumatic actuator is installed in a drive arrangement. The pneumatic piston is then also arranged concentrically and/or coaxially to the drive shaft and can uniformly actuate the functional element.

The pneumatic piston preferably sealingly closes the pneumatic chamber. Therefore the pneumatic piston may include at least one sealing element, preferably a lip seal. A pressure can then be applied in the pneumatic chamber for moving the pneumatic piston. When a positive pressure is applied, i.e. a pressure that is greater than the ambient pressure in an area surrounding the pneumatic actuator, the pneumatic piston is moved out of the pneumatic chamber performing a positive stroke. Even at its outmost position the pneumatic piston is still at least partially arranged on the guide shaft. When a negative pressure is applied, i.e. a pressure lower than the ambient pressure, the piston is moved into the pneumatic chamber, performing a negative stroke. Preferably, the pneumatic piston is biased in a positive stroke direction and towards the first side. Particularly preferred, the pneumatic actuator includes a spring element for biasing the pneumatic piston in the positive stroke direction. Preferably, the negative stroke may also be performed by or assisted by a biasing member connected to the pneumatic piston.

Preferably, the main body includes one or more fastening elements for fixing the pneumatic actuator to an interface, preferably an interface of a motor, a chassis, a gearbox or a clutch. The fixing elements are preferably formed as loops for receiving screws. The main body may also include one or more threads for receiving screws. The main body preferably includes one or more pneumatic channels for directing air into the pneumatic chamber. Additionally or alternatively the piston may also include pneumatic channels for directing air into the pneumatic chamber. Preferably, the main body includes an air inlet for sealingly connecting an air supply, particularly preferred an air distribution plate of an air supply. Pressurized air may then be applied to the pneumatic chamber via the air supply and the one or more pneumatic channels. The pneumatic channels and/or the air inlet are preferably adapted for exhausting air from the pneumatic chamber. However, the main body may also comprise an individual air outlet and/or individual exhaust channels.

In a first preferred embodiment the first material is aluminum. In this regard, aluminum also includes aluminum alloys and may include impurities. The inventors have found that a main body made from aluminum can be manufactured at high quantities and low cost, because aluminum is a material well suited for die casting. Moreover, aluminum provides sufficient strength to resist pressure differences between the pneumatic chamber and the surrounding area and provides sufficient wear resistance when in sliding contact with a sealing element of the pneumatic piston. Furthermore, aluminum is lightweight and relatively inexpensive. Preferably, the first material is selected from the group of AlMgSi7, AlMgSi12, AlCuMgPb, AlCuBiPb, AlMgSiPb, AlMgSi0,5, Al Mg Si1, Al99,5, AlMg3, AlMg1.

In a further preferred embodiment, the second material is steel. Steel provides a high wear resistance and is generally available at low cost. Preferably, the first material is selected from the group of X14CrMopS17 QT 650, X8CrNiS18-9, S235JR, S235, S275, S355, S275 N/NL, S355 N/NL, 13CrMo4-5. Preferably, the guide shaft is a rotationally symmetrical guide shaft. The guide shaft may then be manufactured by turning which is a well suited and cost efficient manufacturing method for steel. Particularly preferred the second material comprises a surface coating. The surface coating is preferably a wet painted coating, a PTFE coating, a DLC coating, a ceramic coating, and/or a polymer coating.

Preferably, the guide shaft includes a radial collar abutting the main body. The radial collar extends substantially perpendicular to a longitudinal axis of the guide shaft. The longitudinal axis defines an actuation direction of the pneumatic piston arranged on the guide shaft. The radial collar ensures correct placement of the guide shaft relative to the main body in the actuation direction. Moreover, the radial collar abutting the main body is adapted to transmit forces, which are applied to the guide shaft by the pneumatic piston upon its movement, to the main body. This allows for a stiff construction and a secure fixation of the guide shaft to the main body. An overall contact area between guide shaft and main body is also increased by the radial collar.

It is further preferred that the fixing portion of the main body includes a radial recess that abuts the radial collar. A radial recess is simple to manufacture and provides a predefined contact surface for the guide shaft. Preferably, the radial collar is fully received in the radial recess. The radial collar is then effectively protected from damages by the surrounding main body. It may also be preferred that the fixing portion includes a protrusion for abutting the radial collar of the guide shaft. Such a protrusion protrudes from a surrounding surface of the main body and provides an easily accessible surface.

The fixing portion of the main body preferably includes a radial inner face abutting the guide shaft. The radial inner face abutting the guide shaft prevents tilting of the guide shaft relative to the main body. Radial forces applied to the guide shaft are effectively transmitted to the main body via the radial inner face. The radial inner face preferably is a continuous face of the main body. Preferably, the radial inner face is adapted for centering the guide shaft, particularly preferred for centering the guide shaft relative to a surface of the main body defining the pneumatic chamber. In this case the radial inner face defines (centers) the radial position of the guide shaft relative to the main body. Preferably, the radial inner face abuts a shaft portion of the guide shaft. The guide shaft additionally or alternatively may also be centered by the radial collar abutting the radial recess. Preferably, the radial inner face has a length in the longitudinal direction in a range of 0.01 to 0.5, preferably 0.05 to 0.5, preferably 0.05 to 0.4, preferably 0.05 to 0.3, particularly preferred 0.05 to 0.2 of a total length of the guide shaft.

According to a preferred embodiment, the radial inner face defines a first contact area between the main body and the guide shaft having a value in a range of 500 $mm^2$ to 5,000 $mm^2$, preferably 500 $mm^2$ to 4,000 $mm^2$, preferably 500 $mm^2$ to 3,000 $mm^2$, preferably 1,000 $mm^2$ to 3,000 $mm^2$, preferably 1,000 $mm^2$ to 2,500 $mm^2$, preferably 1,500 $mm^2$ to 2,500 $mm^2$, particularly preferred 1,500 $mm^2$ to 2,000 $mm^2$. In a further preferred embodiment, the radial collar defines a second contact area between the main body and the guide shaft having a value in a range of 500 mm² to 5,000 mm², preferably 500 mm² to 4,000 mm², preferably 500 mm² to 3,000 mm², preferably 1,000 mm² to 3,000 mm², preferably 1,000 mm² to 2,500 mm², preferably 1,500 mm² to 2,500 mm², particularly preferred 2,000 mm² to 2,500 mm². A second contact area in the preferred range is large enough to prevent damages to the radial collar and or the main body when forces in the longitudinal direction applied to the guide shaft are transmitted to the main body. Moreover such forces can be uniformly transmitted to the main body and surface pressure peaks are prevented.

In a particularly preferred embodiment, an overall contact area between the main body and the guide shaft is defined by the first contact area and the second contact area. Preferably, the overall contact area has a value in a range of 1,000 mm² to 10,000 mm², preferably 1,000 mm² to 8,000 mm², preferably 1,000 mm² to 6,000 mm², preferably 2,000 mm² to 6,000 mm², preferably 2,000 mm² to 5,000 mm², preferably 3,000 mm² to 5,000 mm², particularly preferred 3,500 mm² to 4,500 mm². Preferably, the first contact area and the second contact area are connected. By connecting the first and second contact areas the fixing portion can be manufactured with high accuracy. For example the first and second contact areas of the main body may then be manufactured from one side and the need to reclamp the main body during machining is eliminated.

According to a further preferred embodiment, the guide shaft is sealingly fixed to the main body. Preferably, a sealing element is sandwiched between the guide shaft and the main body. In a particularly preferred embodiment the sealing element is sandwiched between the radial collar and the fixing portion. The guide shaft may then be screwed to the main body and/or fixed to the main body with rivets.

Preferably, the guide shaft is glued to the main body. By gluing the guide shaft to the fixing portion a durable and sealing fixation between said elements is achieved. Glue can penetrate into small cavities and provides effective sealing. The need for a separate sealing element is eliminated. However, a sealing element for sealing a transition between the guide shaft and the main body is still preferred. By gluing the guide shaft to the main body manufacturing of the pneumatic body is facilitated. The inventors have found out that glue is an appropriate and durable fixation method for fixing a steel guide shaft to an aluminum main body. Preferably, the glue is chosen from the group of cyanoacrylate adhesives, epoxy resin adhesives, and polyurethane adhesives.

According to an alternative embodiment the guide shaft is welded, preferably friction welded, to the main body. By welding the guide shaft to the main body, a strong and highly durable connection of the two components can be established. Moreover, the weld is continuous such that the guide shaft is sealingly connected to the main body. Friction welding is a rapid manufacturing process adapted to high quantities. Moreover, friction welding is particularly adapted for welding different material components.

Preferably, the pneumatic piston includes one or more sliding guide rings forming a sliding surface contacting the guide shaft, wherein the sliding guide rings are composite sliding guide rings having a steel core and a PTFE outer layer. PTFE stands for polytetrafluorethylen. The steel core provides strength to the guide rings while the PTFE outer layer has a low friction resistance. Preferably, the sliding guide rings are exchangeably arranged on the pneumatic piston. Because exchangeable sliding guide rings are inexpensive and easy to replace, life-cycle time cost of the pneumatic actuator is reduced. By applying a PTFE outer layer, wear on the guide shaft is reduced. Composite sliding guide rings having a matrix material with embedded carbon fibers and/or glass fibers are also preferred. For example, such a composite sliding guide ring may have a PTFE matrix with embedded carbon fibers. Preferably, the second material of the guide shaft and an outer layer material of the outer layer of the sliding guide rings are chosen such that a wear rate of the guide shaft has a value of lower than 5 µm/km, preferably between 0.05 µm/km to 5 µm/km, preferably 0.05 µm/km zo 4 µm/km, preferably 0.05 µm/km to 3 µm/km, preferably 0.05 µm/km to 2 µm/km, preferably 0.1 µm/km to 2 µm/km, preferably 0.1 µm/km to 1 µm/km, particularly preferred 0.18 µm/km to 0.7 µm/km. In a particularly preferred embodiment, a wear rate in the preferred range applies if a PTFE outer layer is used.

According to a second aspect of the present disclosure, the above stated problem is solved by a clutch assembly for a commercial vehicle comprising a clutch and a pneumatic actuator according to the first aspect of the present disclosure.

In a third aspect of the invention, the above stated problem is solved by a commercial vehicle including a clutch assembly according to the second aspect of the invention. It shall be understood that the pneumatic actuator according to the first aspect of the invention, the clutch assembly according to the second aspect of the invention, and the vehicle according to the third aspect of the invention preferably have similar or equal aspects, in particular as they are described in the dependent claims. Thus, reference is made to the above description of the pneumatic actuator according to the first aspect of the invention.

For a more complete understanding of the present disclosure, the present disclosure will be further described in detail with reference to the accompanying drawings. The detailed description will illustrate and describe what is considered as a preferred embodiment of the present disclosure. It should of course be understood that various modifications and changes in form or detail could readily be made without departing from the spirit of the present disclosure. It is therefore intended that the present disclosure may not be limited to the exact form and detail shown and described herein, nor to any-thing less than the whole of the present disclosure disclosed herein and as claimed here-in after. Further, the features described in the description, the drawings, and the claims disclosing the invention may be essential for the invention considered alone or in combination. In particular, any reference signs in the claims shall not be construed as limiting the scope of the invention. The wording "comprising" does not exclude other elements or steps. The word "a" or "an" does not exclude the plurality. The wording "a number of" items comprising also the number 1, i.e. a single item, and further numbers like 2, 3, 4 and so forth.

DETAILED DESCRIPTION

Figure 1:
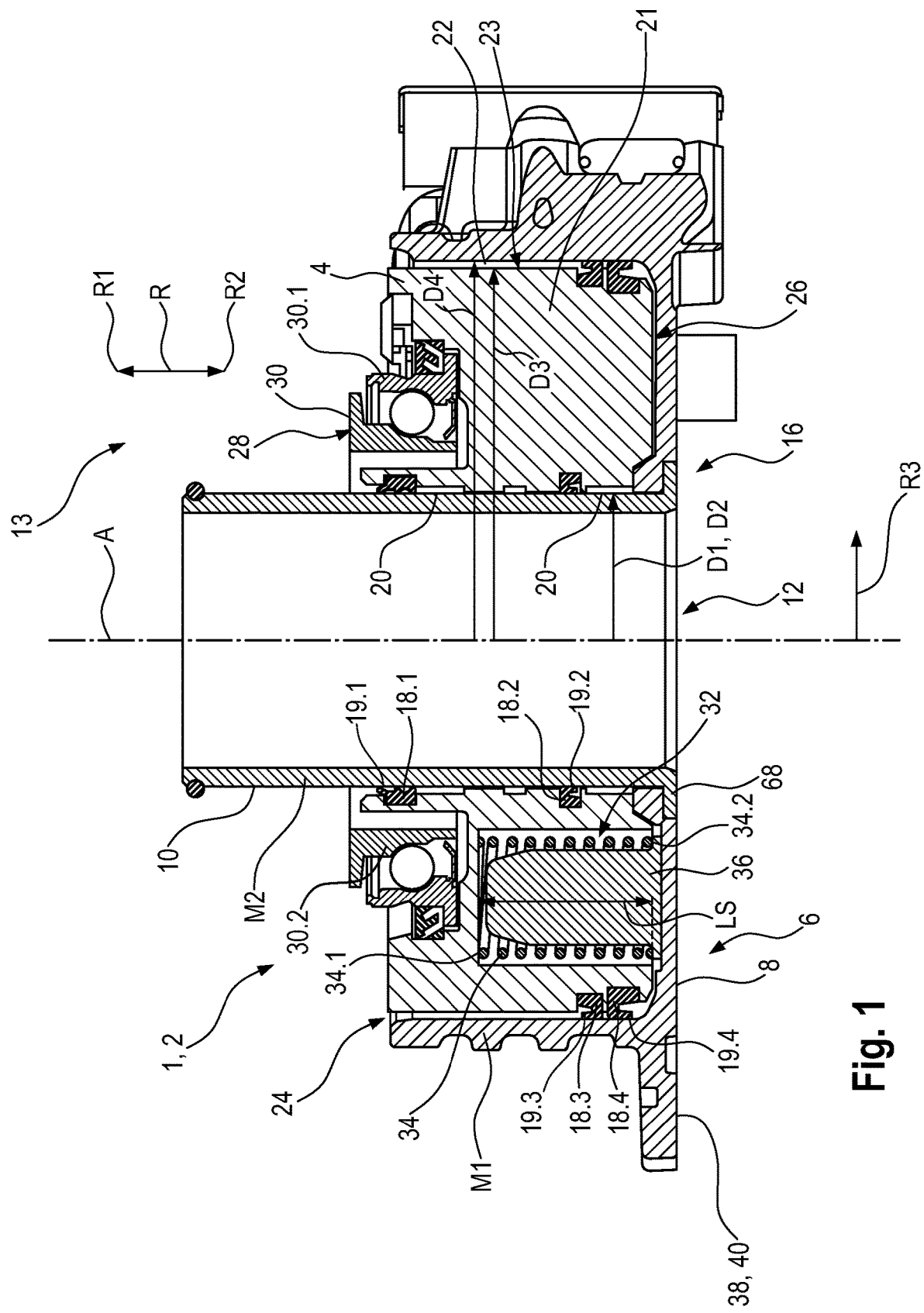
FIG. 1 is a cross-section view of a pneumatic actuator.

A pneumatic actuator 1, in particular a pneumatic clutch actuator 2 according to FIG. 1, includes a pneumatic piston 4 and a pneumatic body 6. The pneumatic body 6 is configured as a two-part construction having a main body 8 and a guide shaft 10. According to the present disclosure the main body 8 is manufactured from a first material M1 and guide shaft 10 is manufactured from a second material M2 different from the first material M1. The guide shaft defines a longitudinal axis A of the pneumatic actuator 1 and includes a central orifice 12 for passing through a shaft 110 (not shown in FIG. 1). The guide shaft 10 is fixed to a fixing portion 16 of the main body 8. In this embodiment, main body 8 and guide shaft 10 are only connected via the fixing portion 16. By fixing the guide shaft 10 to the main body 8, the pneumatic body 6 is assembled.

The pneumatic piston 4 is received in a pneumatic chamber 14 (cf. FIG. 2) of the pneumatic body 6 that is defined cooperatively by the guide shaft 10 and the main body 8. Upon insertion from a first side 13 of the main body 8, the pneumatic piston 4 closes the pneumatic chamber 14 and allows pressure levels different from an ambient pressure level to be applied therein.

The pneumatic piston 4 is movably arranged in the pneumatic chamber 14. For actuating a functional element (not shown), air is directed to the pneumatic chamber 14 at a higher pressure level than an ambient pressure level. This results in a movement of the pneumatic piston 4 in an actuation direction R, in particular a positive stroke direction R1. By releasing pressure from the pneumatic chamber 14 the pneumatic piston 4 can be moved in a negative stroke direction R2. Movement of the pneumatic piston 4 in the negative stroke direction R2 may additionally or alternatively be instantiated by reducing the pressure level below the ambient pressure. The pneumatic piston 4 can be biased in the negative stroke direction R2 by a biasing member (not shown). Hence, the pneumatic piston 4 is movable back and forth in the pneumatic chamber 6. In this embodiment the pneumatic chamber 14 is annular and concentrically arranged with the longitudinal axis A defined by the guide shaft 10.

The pneumatic piston 4 is slidably arranged on the guide shaft 10 and in this embodiment is ring shaped. For contacting the guide shaft 10, the pneumatic piston 4 includes sliding guide rings 20. The sliding guide rings 20 are fixed to a piston body 21 of the pneumatic piston 4 and slide relative to the guide shaft 10 upon movement of the pneumatic piston 4 in the pneumatic chamber 14. As an inner diameter D1 of the sliding guide rings 20 of the pneumatic piston 4 is substantially identical to an outer diameter D2 of the guide shaft 10, movement of the pneumatic piston 4 in a radial direction R3 perpendicular to the longitudinal axis is inhibited. It shall be understood that substantially identical diameters D1, D2 may include appropriate tolerances. Preferably, the substantially identical diameters D1, D2 have fine tolerances according to ISO 2768. Preferably, the guide shaft 10 and the sliding guide rings 20 have a clearance fit. For example and preferably, the outer diameter D2 may have a value of 74 mm and a tolerance value in a range of negative 0.06 mm (−0.06 mm) to negative 0.09 mm (−0.09 mm).

In this embodiment an outer layer 84 (FIG. 4) of the sliding guide rings 20 is made from PTFE to reduce friction when the pneumatic piston 4 moves relative to the guide shaft 10. The pneumatic piston 4 comprises two sliding guide rings 20 that are spaced apart along the longitudinal axis A. Thereby, tilting of the pneumatic piston 4 relative to the guide shaft 10 is prevented. The pneumatic piston 4 may also include only one or more than two sliding guide rings 20. Sliding guide rings 20 can easily be replaced once worn out. Instead of replacing the entire pneumatic piston 4, only the sliding guide rings 20 can be replaced and an overall life cycle cost of the pneumatic actuator is reduced effectively. To prevent air from escaping the pneumatic chamber 14, the pneumatic cylinder 4 includes two inner lip seals 18.1, 18.2 contacting the guide shaft 10. A leg 19.1 of a first inner lip seal 18.1 extends in the positive stroke direction R1 while a leg 19.2 of a second inner lip seal 18.2 extends in the negative stroke direction R2 whereby effective sealing of the pneumatic chamber 14 is achieved.

An outer diameter D3 of the pneumatic piston 4 is smaller than a corresponding inner diameter D4 of the pneumatic chamber 14. A small gap 22 is formed between the main body 8 and the pneumatic piston 4 that prevents sliding contact between the pneumatic piston 4 and the main body 8 upon movement of the pneumatic piston 4. For sealing the pneumatic chamber 14, the pneumatic piston 4 further includes outer lip seals 18.3, 18.4. A leg 18.3 of a first outer lip seal 18.3 contacts the main body 8 and extends in the positive stroke direction R1. As with the first inner lip seal 18.1, the first outer lip seal 18.3 is also closer to an opening 24 of the main body 8 than respective second inner and outer lip seals 18.2, 18.4. A leg 19.4 of the second outer lip seal 18.4 extends in the negative stroke direction R2. Application of two sets of lip seals 18.1, 18.2, 18.3, 18.4 having legs 19.1, 19.2, 19.3, 19.4 extending in opposite directions R1, R2 effectively prevents air from escaping the pneumatic chamber 14.

Excluding the lip seals 18.1, 18.2, 18.3, 18.4, only the sliding guide rings 20 of the pneumatic piston 4 contact the guide shaft 10 of the pneumatic body 6. Upon movement, the sliding guide rings 20 slide along the guide shaft 10. Thereby, the sliding guide rings 20 of the pneumatic piston 4 rub against the guide shaft 10 of the pneumatic body 6. On an outer perimeter 23 of the pneumatic piston 4, gap 22 prevents the pneumatic piston 4 from rubbing against main body 8. As sliding contact between the guide shaft 10 and the pneumatic piston 4 is needed for guiding the pneumatic piston 4 in the pneumatic chamber 14, no gap is applied between the guide shaft 10 and the pneumatic piston 4. Even though friction can be reduced by choosing a low friction material for the guide rings 20, friction on the guide shaft 10 cannot be fully eliminated. Hence, the guide shaft 10 is much more susceptible to wear than the main body 8 of the pneumatic body 6.

The two-part construction of the pneumatic body 6 addresses this problem. The guide shaft 10 is made from a second material M2 having a higher wear resistance than a first material M1 of the main body 8. Therefore, even though the guide shaft 10 encounters higher friction, it is resistant to wear. Due to gap 22, wear is of less importance to the main body 8, and the first material M1 of the main body 8 can be adapted to other requirements. For example, a first material M1 may be chosen that has less wear resistance than the second material M2 but is easier to machine, allows for other manufacturing processes, and/or is less expensive. In this embodiment, the first material M1 is aluminum and the second material M2 is steel. Steel has a higher wear resistance but is harder to machine than aluminum. Especially because the main body 8 defines a larger part of the pneumatic chamber 14 than the guide shaft 10, a larger surface area of the main body 8 needs to be machined during manufacturing of the pneumatic body 6. By choosing aluminum for the first material M1, manufacturing cost is effectively reduced. The guide shaft 10 is substantially cylindrical. This simple geometric shape allows for easy manufacturing of the guide shaft 10.

Generally, a cavity can be produced more easily if the bottom of the cavity has no significant elevations. Forming the pneumatic body 6 from a main body 8 and a substantially cylindrical guide shaft 10 further facilitates the manufacturing process of the pneumatic body 6, in that the pneumatic chamber 14 can be machined more easily because, prior to assembly, the bottom 26 of the pneumatic chamber 16 is substantially flat and easily accessible with tools.

On a first piston side 28 opposite the bottom 26, a bearing 30 is attached to the pneumatic piston 4. In this embodiment an outer ring 30.1 of the bearing 30 is fixed to the pneumatic piston 4 while an inner ring 30.2 is rotatable with regard to the outer ring 30.1. The inner ring 30.2 can be connected to a functional element (not shown). The bearing 30 thereby allows for relative movement of the functional element with regard to the pneumatic actuator 1.

The pneumatic piston 4 comprises an internal cavity 32. A spring 34 is received in the internal cavity 32 and arranged on a support member 36. The support member 36 is positioned on the bottom 26 of the pneumatic chamber 14 and prevents the spring 34 from bending when it is compressed in the negative stroke direction R2. A first end 34.1 of the spring abuts the pneumatic piston 4 and a second end 34.2 of the spring 34 opposite the first end 34.1 abuts the support member 36. A spring length LS is chosen such that the spring 34 slightly biases the pneumatic piston 4 in the positive stroke direction R1. Thereby the spring 34 allows the pneumatic actuator 1 to compensate for wear in the functional element connected to the pneumatic actuator 1. If for example a clutch 108 (FIG. 5) connected to the pneumatic actuator 1 wears out over time a zero point position of the clutch 108 moves away from the pneumatic actuator 1 in the positive stroke direction R1. This movement of the zero point position can be compensated by the spring 34.

For attaching the pneumatic actuator 1 to an interface (not shown) of another object, for example a gearbox, chassis, or motor of a vehicle, the main body 8 includes multiple fixing elements 38 (only one fixing element 38 shown). In this embodiment the fixing elements 38 are loops 40 for attaching the pneumatic actuator 1 to the interface with screws. The loop 40 is provided with a through hole (not shown) and a screw head can abut the loop 40 for applying holding forces to the main body 8.

Figure 2:
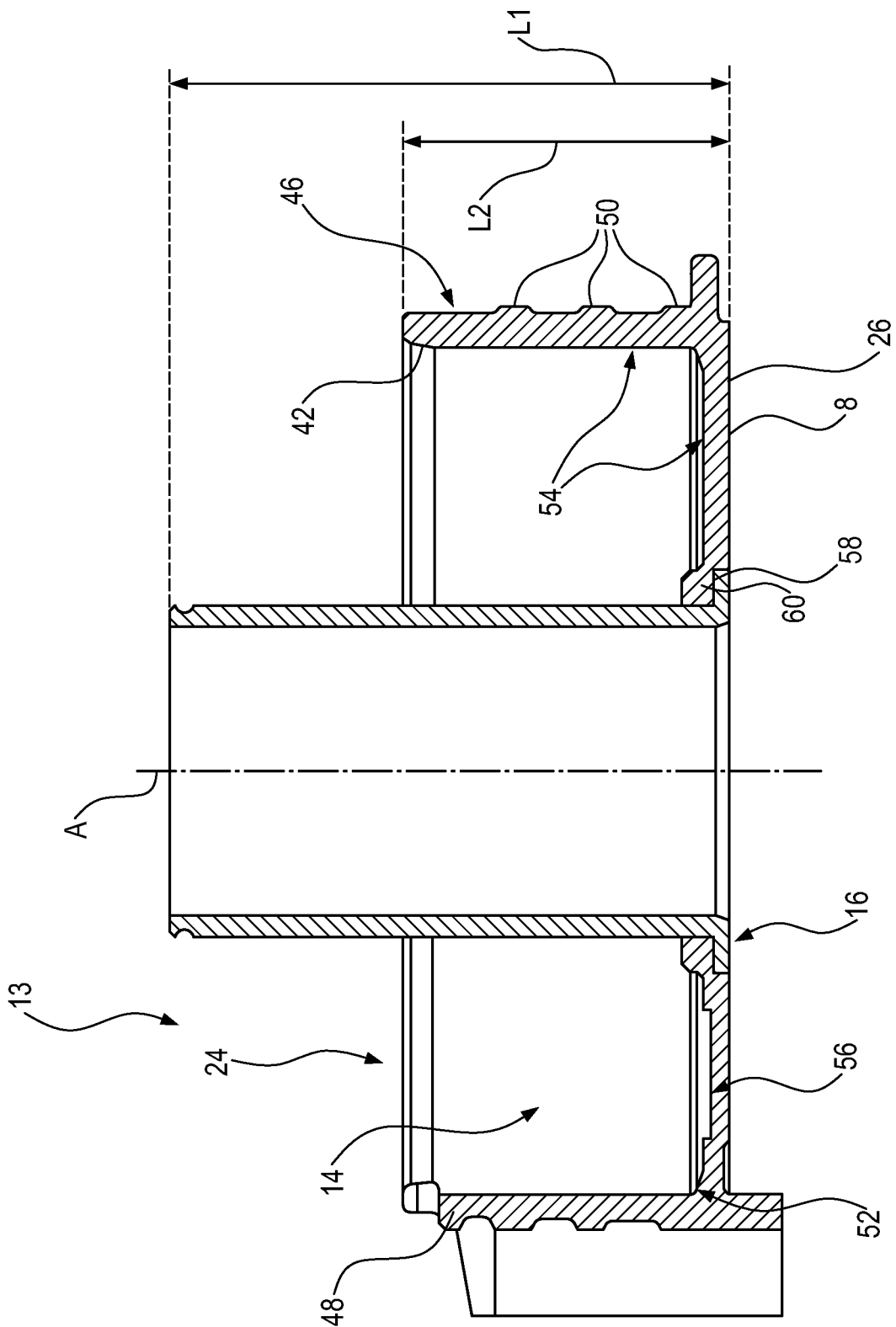
FIG. 2 is a cross-section view of a pneumatic body of the pneumatic actuator of FIG. 1.

FIG. 2 shows the pneumatic body 6 without the pneumatic cylinder 4. The pneumatic chamber 14 is substantially u-shaped and accessible from the first side 13 of the pneumatic actuator 1. To facilitate insertion of the pneumatic piston 4, an opening edge 42 of the main body 8 defining the opening 24 is chamfered. The guide shaft 10 is fixed to the fixing portion 16. On the first side 13, the guide shaft 10 extends beyond the main body 8. On a second side 44 opposite the first side 13, the guide shaft 10 is preferably flush with the main body 8.

The guide shaft 10 has a shaft length L1 parallel to the longitudinal axis A and the main body has a body length L2 parallel to the longitudinal axis. Preferably, a length ratio of the shaft length L1 to the body length L2 has a value in a range of 2 to 1, preferably 1.8 to 1, preferably 1.8 to 1.4. An outer side 46 of a sidewall 48 of the main body 8 includes multiple ribs 50. The ribs 50 strengthen the main body 8 and prevent deformation of the main body 8 when a positive pressure is applied in the pneumatic chamber 14. Moreover, ribs 50 functioning as cooling fins help in thermal regulation of the pneumatic actuator 1.

A transition portion 52 connecting the sidewall 48 to the bottom 26 is chamfered. The chamfered transition portion 52 facilitates machining of an inner surface 54 of the main body 8 that defines the pneumatic chamber 14. For receiving the support member 36, the bottom 26 of the pneumatic chamber 14 includes a circular recess 56. A radial inner portion 58 of the bottom 26 defines the fixing portion 16. In this embodiment, the fixing portion 16 includes an axial protrusion 60 extending in the actuation direction R parallel to the longitudinal axis A. A flat radial inner portion 58 of bottom 26 is also preferred. In this embodiment the guide shaft 10 is glued to the fixing portion 10 of main body 8.

Figure 3:
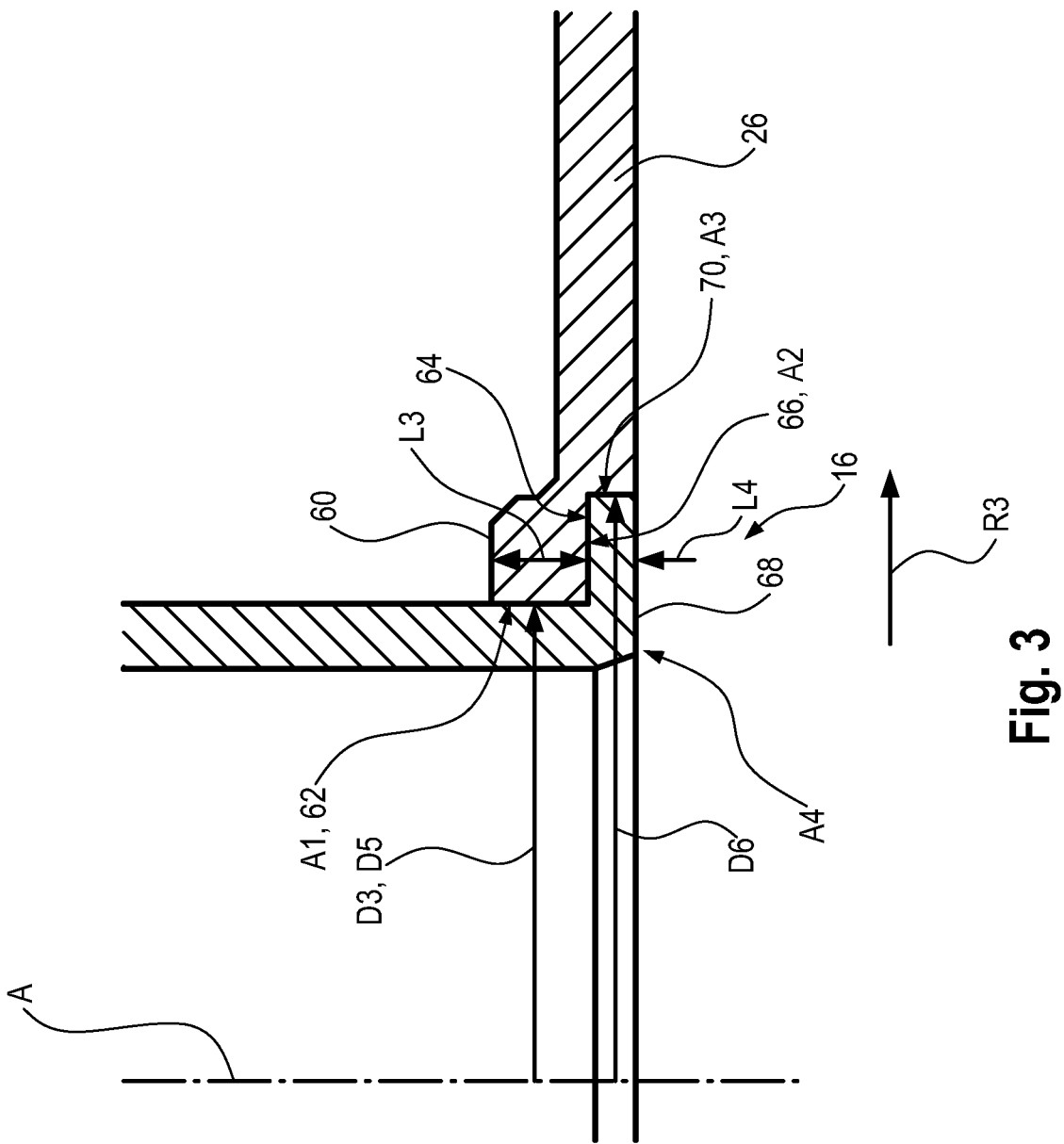
FIG. 3 is a detail view of a fixing portion of the pneumatic actuator.

FIG. 3 shows a detail of the fixing portion 16. The fixing portion 16 is formed in bottom 26 and axial protrusion 60. A first radial inner face 62 of the fixing portion 16 extends parallel to the longitudinal axis A of the guide shaft 10. The outer diameter D3 of the guide shaft 10 is substantially equal to a first fixing portion diameter D5 of the first radial inner face 62 of the fixing portion 16. It shall be understood that a small glue gap may be formed between the first radial inner face 62 and the guide shaft 10 and the diameters D3 and D5 may still be substantially equal. Moreover, the guide shaft 10 may still abut the fixing portion 16 if such a small glue gap is formed between the guide shaft 10 and the first radial inner face 62. Upon assembly, the glue gap is filled with glue and thereby the guide shaft 10 is fixed to the fixing portion 16. The first radial inner face 62 defines a first contact area A1 between the guide shaft 10 and the main body 8. In this embodiment, the first contact area A1 is defined by the first fixing portion diameter D5 multiplied with a first fixing portion length L3 of the fixing portion 16 parallel to the longitudinal axis A. Preferably, the first radial inner face 62 comprises micro structures (not shown) increasing the first contact area A1.

Adjacent to the first radial inner face 62, the fixing portion 16 includes a radial recess 64 extending in the radial direction R3. The radial recess 64 has a recess diameter D6 in the radial direction R3 and a recess length L4 parallel to the longitudinal axis A. The radial recess 64 defines an axial face 66 that defines a second contact area A2 between the guide shaft 10 and the fixing portion 16. In particular, a radial collar 68 of the guide shaft 10 abuts the radial recess 64. The radial collar 68 defines a position of the guide shaft 10 in the actuation direction R relative to the main body 8. Moreover, the second contact area A2 between the guide shaft 10 and the fixing portion 16 increases an overall contact area A4 between the guide shaft 10 and the main body 8. In this embodiment the overall contact area A4 further comprises a third contact area A3 defined by a second radial inner face 70 of the fixing portion 16. It may also be preferred that the overall contact area A4 is defined by the first contact area A1 and the second contact area A2 only. When only areas A1 and A2 define overall contact area A4, a gap is preferably formed between the radial collar 68 and the second radial inner face 70 of the fixing portion. The third contact area A3 is defined by a second fixing portion diameter D6 in the radial direction R and the recess length L4. The second radial inner face 70 of the fixing portion and/or the axial face 66 may also include microstructures for increasing the overall contact area A4 between the guide shaft 10 and the fixing portion 16. Such microstructures are particularly preferred when the guide shaft 10 is glued to the main body 8.

The radial collar 68 abuts the radial recess 64 and the guide shaft 10 abuts the first radial inner face 62. In this embodiment the radial collar 68 further abuts the second radial inner face 70 of the fixing portion 16. Guide shaft 10 and fixing portion 16 are therefore in contact on at least two perpendicular faces, in particular the first and/or second radial inner face 62, 70 and the axial face 66, which effectively prevents tilting of the guide shaft 10 relative to the main body 8. In this embodiment and preferably, the guide shaft 10 and main body 8 only contact each other at the fixing portion 16. The fixing portion 16 is continuous, meaning that all of the contact faces 62, 66, 70 are connected to each other. A continuous fixing portion 16 facilitates manufacturing and thereby reduces overall production cost. As described above with regard to the first radial inner face 62, a glue gap may also formed between the guide shaft 10 and the radial recess 64 and the radial collar 68 is still considered to contact/abut the radial recess 64.

Additionally or alternatively, the fixing portion 16 may include a conical inner face and the guide shaft 10 may comprise a corresponding conical portion abutting the conical face of the fixing portion 16.

Figure 4:
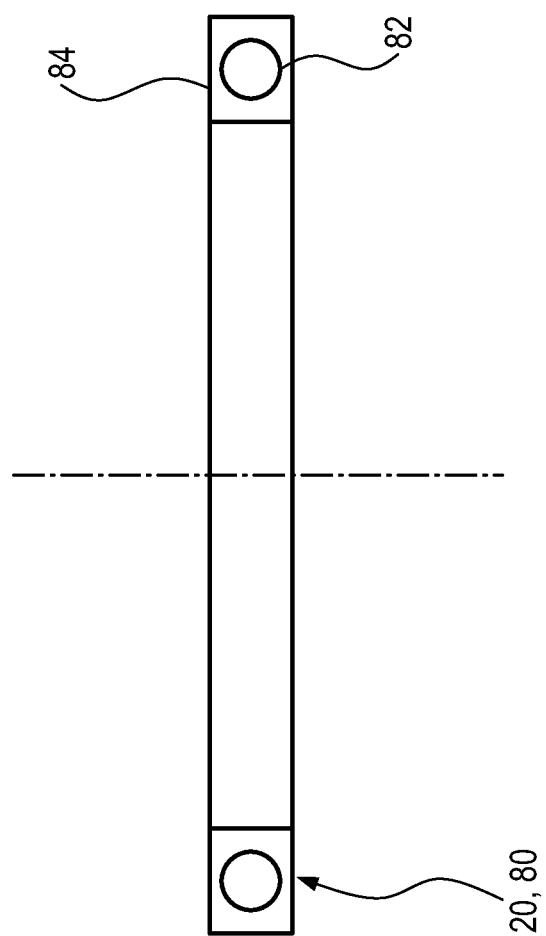
FIG. 4 is a schematic cross-section view of a sliding guide ring of the pneumatic actuator.

FIG. 4 depicts a cross section of a sliding guide ring 20 that is formed as a composite sliding guide ring 80. The composite sliding guide ring 80 comprises a core 82 and an outer layer 84. The core 82 is made from steel while the outer layer 84 is made from PTFE. Core 82 may preferably be formed as a solid ring, wire or wire cable.

Figure 5:
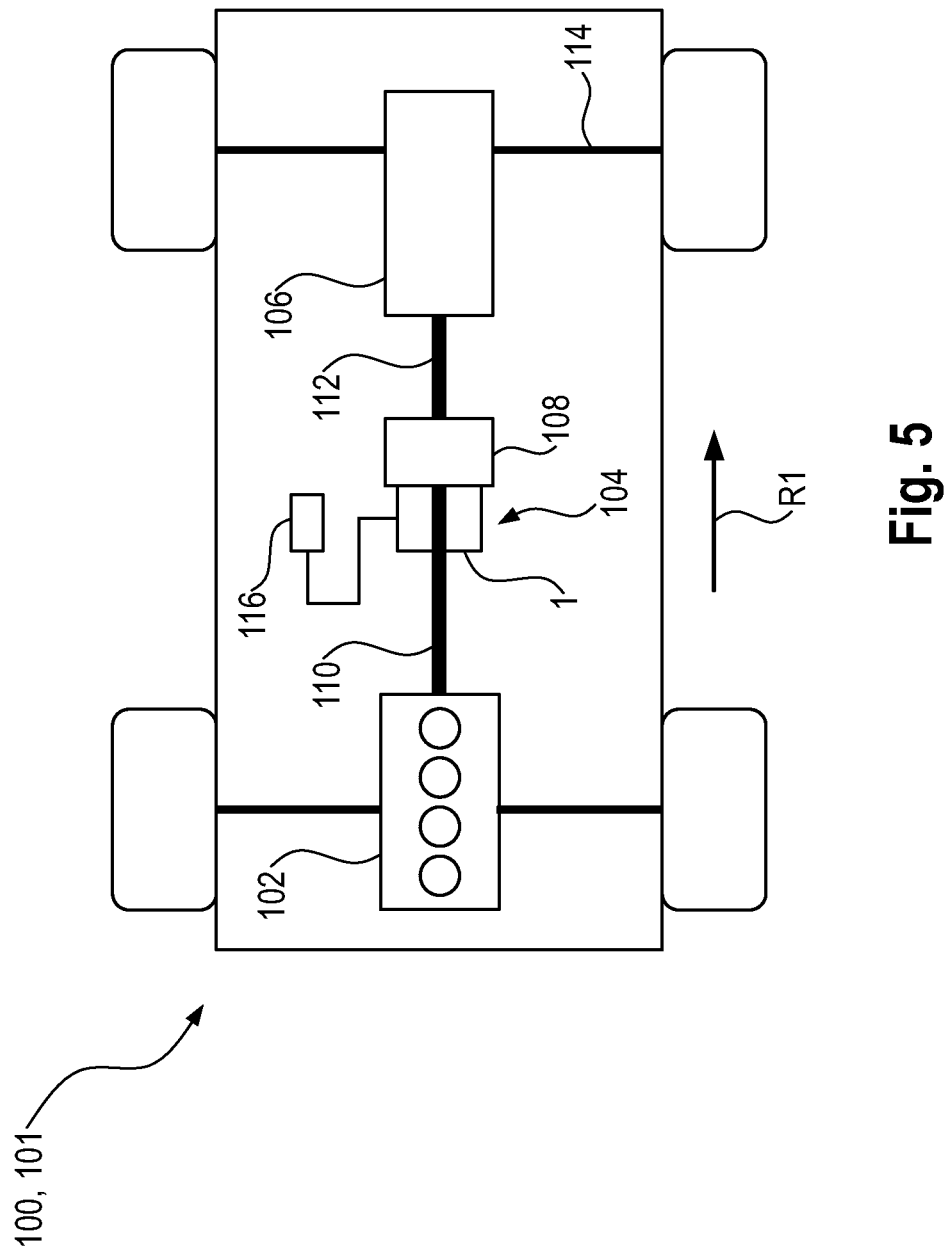
FIG. 5 is a schematic view of a vehicle.

FIG. 5 shows a vehicle 100 having a motor 102, a clutch assembly 104, and a gearbox 106. In this embodiment, the vehicle 100 is a commercial vehicle 101 such as a truck or bus. Motor 102 is connected to a clutch 108 of the clutch assembly 104 via drive shaft 110. Drive shaft 110 extends through a pneumatic actuator 1 of the clutch assembly 104 operatively coupled to the clutch 108. An output shaft 112 connects the clutch 108 to gearbox 106. When clutch 108 is closed, torque is transmitted from the motor 102 via drive shaft 110, clutch 108, output shaft 112, and gearbox 106 to a rear axle 114 of the vehicle 100. The pneumatic actuator 1 is concentrically arranged on the drive shaft 110. When the pneumatic actuator 1 is actuated, pneumatic piston 4 (not shown in FIG. 5) opens the clutch 108 and disconnects the drive shaft 110 from the output shaft 112 such that no torque is transmitted from motor 102 to the rear axle 114 of the vehicle 100. Once the clutch 108 is opened a gear of the gearbox 106 can be shifted. After that, the pneumatic piston 4 moves in the negative stroke direction R2 (not shown) and closes the clutch 108. The pneumatic actuator 1 is preferably coupled to a control unit 116 that is adapted to automatically control the pneumatic actuator 1.

LIST OF REFERENCE SIGNS (PART OF THE DESCRIPTION)

1 pneumatic actuator
2 pneumatic clutch actuator
4 pneumatic piston
6 pneumatic body
8 main body
guide shaft
12 central orifice
13 first side
14 pneumatic chamber
16 fixing portion
17 gap
18.1, 18.2 inner lip seal
18.3, 18.4 outer lip seal
19.1, 19.2 legs
19.3, 19.4 legs
20 sliding guide ring
21 piston body
22 gap
23 outer perimeter of pneumatic piston
24 opening of the main body
26 bottom of pneumatic chamber
28 first piston side
30 bearing
30.1 bearing outer ring
30.2 bearing inner ring
32 internal cavity
34 spring
34.1 first end of spring
34.2 second end of spring
36 support member
38 fixing elements
40 loops
42 opening edge
44 second side
46 outer side
48 sidewall
50 ribs
52 transition portion
54 inner surface
56 circular recess
58 radial inner portion
60 axial protrusion
62 first radial inner face
64 radial recess
66 axial face
68 radial collar
70 second radial inner face
80 composite sliding guide ring
82 core
84 outer layer
100 vehicle
101 commercial vehicle
102 motor
104 clutch assembly
106 gearbox
108 clutch
110 drive shaft
112 output shaft
114 rear axle
116 control unit
A longitudinal axis
A1 first contact area
A2 second contact area
A3 third contact area
A4 overall contact area
LS spring length
L1 piston length
L2 body length
L3 first fixing portion length
L4 recess length
R actuation direction
R1 positive stroke direction
R2 negative stroke direction
R3 radial direction
D1 inner diameter sliding guide rings
D2 outer diameter guide shaft
D3 outer diameter pneumatic piston
D4 inner diameter pneumatic chamber
D5 fixing portion diameter
D6 second fixing portion diameter

What is claimed is:

1. A pneumatic actuator (1), in the form of a pneumatic clutch actuator (2) for a commercial vehicle (101), comprising:

a pneumatic piston (4) for actuating a functional element, and a pneumatic body (6), the pneumatic body (6) comprising:
a main body (8), and a guide shaft (10) for guiding the pneumatic piston (4), the guide shaft (10) having a central orifice (12) for passing a shaft (110) through the pneumatic actuator (1), wherein a pneumatic chamber (14) is at least partially defined between the guide shaft (10) and the main body (8) and arranged around the guide shaft (10), the pneumatic piston (4) being received at least partially in the pneumatic chamber (14), and being slidably arranged on the guide shaft (10), wherein the main body (8) and the guide shaft (10) are separate or operationally coupled elements, wherein the guide shaft (10) is fixed to a fixing portion (16) of the main body (8), and wherein the main body (8) is made from a first material (M1) and the guide shaft (10) is made from a second material (M2) having a higher wear resistance than the first material (M1);

wherein the fixing portion includes an axial protrusion that defines a first radial inner face that defines a first contact area (A1), wherein the fixing portion (16) of the main body (8) main body includes a radial recess (64);

wherein the guide shaft (10) includes a radial collar (68);

wherein the radial recess (64) defines an axial face (66) and defines a second contact area (A2), wherein the radial recess (64) defines a second radial inner face (70) that defines a third contact area (A3) between the main body (8) and the radial collar (68) of the guide shaft (10), and wherein the first, second, and third contact areas are continuous and define an overall contact area (A4).

2. The pneumatic actuator (1) according to claim 1, wherein the first material (M1) is aluminum.

3. The pneumatic actuator (1) according to claim 2, wherein the second material (M2) is steel.

4. The pneumatic actuator (1) according to claim 1, wherein the radial collar (68) abuts the main body (8).

5. The pneumatic actuator (1) according to claim 4, wherein the the radial collar (68) abuts the radial recess (64).

6. The pneumatic actuator (1) according to claim 4, wherein the pneumatic chamber (14) is accessible from a first side (13) of the main body (8) and wherein the radial collar (68) abuts the fixing portion (16) on a second side (44) of the main body (8) opposite the first side (44).

7. The pneumatic actuator (1) according to claim 4, wherein the fixing portion (16) of the main body (8) includes the first and second radial inner faces (62, 70) abutting the guide shaft.

8. The pneumatic actuator (1) according to claim 7, wherein the radial collar (68) and the radial recess (64) define the second contact area (A2) between the main body (8) and the guide shaft (10).

9. The pneumatic actuator (1) according to claim 1, wherein the guide shaft (10) is sealingly fixed to the main body (8).

10. The pneumatic actuator (1) according to claim 9, wherein the guide shaft (10) is glued to the main body (8).

11. The pneumatic actuator (1) according to claim 9, wherein the guide shaft (10) is welded to the main body (8).

12. The pneumatic actuator (1) according to claim 1, wherein the pneumatic piston (4) includes one or more sliding guide rings (20) forming a sliding surface contacting the guide shaft (10).

13. The pneumatic actuator according to claim 12, wherein the sliding guide rings (20) are composite sliding guide rings (80) having a steel core (82) and a PTFE outer layer (84).

14. The pneumatic actuator according to claim 12, wherein radial contact between the pneumatic piston and the guide shaft is made only between the sliding guide rings and an outer surface of the guide shaft.

15. A clutch assembly (104) for the commercial vehicle (101) comprising a clutch (108) and the pneumatic actuator (1) according to claim 1 operably coupled to the clutch (108) for opening and closing the clutch (108).

16. The commercial vehicle (101) comprising the clutch assembly (104) according to claim 15.

17. The pneumatic actuator according to claim 1, wherein the pneumatic piston includes a pair of inner lip seals radially between the guide shaft and the pneumatic piston axially spaced from each other and a pair of outer lip seals radially between the main body and the pneumatic piston axially spaced from each other, wherein the inner and outer lip seals seal the pneumatic chamber for increasing a decreasing pressure on the pneumatic piston.

18. A pneumatic actuator (1), in the form of a pneumatic clutch actuator (2) for a commercial vehicle (101), comprising:

a pneumatic piston (4) for actuating a functional element, and a pneumatic body (6), the pneumatic body (6) comprising:
a main body (8), and a guide shaft (10) for guiding the pneumatic piston (4), the guide shaft (10) having a central orifice (12) for passing a shaft (110) through the pneumatic actuator (1), wherein a pneumatic chamber (14) is at least partially defined between the guide shaft (10) and the main body (8) and arranged around the guide shaft (10), the pneumatic piston (4) being received at least partially in the pneumatic chamber (14), and being slidably arranged on the guide shaft (10), wherein the main body (8) and the guide shaft (10) are separate or operationally coupled elements, wherein the guide shaft (10) is fixed to a fixing portion (16) of the main body (8), and wherein the main body (8) is made from a first material (M1) and the guide shaft (10) is made from a second material (M2) having a higher wear resistance than the first material (M1);

wherein the guide shaft (10) comprises a radial collar (68) abutting the main body (8);

wherein the fixing portion (16) of the main body (8) includes first and second radial inner faces (62, 70) abutting the guide shaft;

wherein the radial collar (68) and a radial recess (64) of the fixing portion (16) defines a second contact area (A2) between the main body (8) and the guide shaft (10);

wherein the fixing portion includes an axial protrusion that defines h first radial inner face that defines a first contact area (A1), the radial recess (64) defines an axial face (66) that defines the second contact area (A2), and the radial recess defines the second radial inner face (70) that defines a third contact area (A3) between the main body (8) and the radial collar (68) of the guide shaft (10), wherein the first, second, and third contact areas are continuous and define an overall contact area (A4).

* * * * *